United States Patent [19]

Pruvot et al.

[11] 3,890,360
[45] June 17, 1975

[54] ENGINE AND TRANSMISSION CONTROL SYSTEM

[75] Inventors: François C. Pruvot, Garches; Roger Maistrelli, Bougival; Pierre Buachet, Paris, all of France

[73] Assignees: Regie Nationale des Usines Renault, Boulogne-Billancourt; Automobiles Peugeot, Paris, both of France

[22] Filed: May 18, 1973

[21] Appl. No.: 361,449

[30] Foreign Application Priority Data
June 2, 1972  France .............................. 72.19933

[52] U.S. Cl. ..................... 60/431; 60/449; 74/857; 74/860; 74/866
[51] Int. Cl. ............................................ F16h 39/50
[58] Field of Search ............ 74/866, 860, 859, 857; 60/449, 431

[56] References Cited
UNITED STATES PATENTS

| | | |
|---|---|---|
| 2,707,405 | 5/1955 | Forster et al. ..................... 74/859 X |
| 3,229,546 | 1/1966 | Nallinger et al. ................. 74/866 X |
| 3,283,606 | 11/1966 | Brueder ................................ 74/857 |
| 3,324,740 | 6/1967 | Lewis et al. .......................... 74/866 |
| 3,665,787 | 5/1972 | Wilkinson ......................... 74/857 X |
| 3,757,610 | 9/1973 | Kubota et al. .................... 74/866 X |

Primary Examiner—Samuel Scott
Assistant Examiner—John Reep
Attorney, Agent, or Firm—Strauch, Nolan, Neale, Nies & Kurz

[57] ABSTRACT

Method and apparatus for effecting coordinated control of the fuel supply to an internal combustion engine and the ratio of the transmission through which the engine is connected to a load, the control being effective to permit the engine to deliver the desired power while operating according to a torque-speed characteristic predetermined particularly by the desired characteristics of minimum fuel consumption, minimum pollution or minimum noise.

7 Claims, 10 Drawing Figures

ENGINE AND TRANSMISSION CONTROL SYSTEM

BACKGROUND OF THE INVENTION

In the past it has been proposed to regulate the speed of an internal combustion engine of a vehicle and the ratio of an associated hydrostatic transmission of the type including a pump and a motor whereby the driver simultaneously determines by a cam control the desired speed of the engine, the maximum torque of the engine and the output of the transmission pump.

In such an arrangement a first device regulates the fuel supply to operate the engine at the desired rpm, a second device regulates the capacity of the transmission pump at a predetermined value while the engine torque, measured by the position of the accelerator pedal or similar device for regulating the fuel supply, is less than the set maximum torque and while the operating hydraulic pressure in the transmission is less than the reference pressure. When the maximum torque is supplied or when the maximum pressure in the transmission is established, the second device effects a reduction of the pump capacity to reduce the torque or pressure.

However, this system does not permit the operation of the engine according to a predetermined optimum torque-speed curve as long as the maximum torque has not been attained. Therefore, it does not assure the operation of the engine with minimal fuel consumption or with minimal pollution.

It has also been proposed to control the ratio of a hydrostatic transmission in which the driver operates the throttle directly by an accelerator pedal and simultaneously determines the desired speed of the engine. In this arrangement the variation of the transmission ratio is controlled as a function of the difference between the desired speed of the engine and its actual speed. If the actual speed is less than the desired speed the output of the pump of the hydrostatic transmission is reduced and vice versa. In continuous operation, for each position of the accelerator pedal there is a corresponding speed of rotation of the engine and an opening of the throttle and consequently a predetermined torque which can be chosen as a function of the desired value of the pollution produced by the engine or fuel consumption of the engine. When the operating pressure in the transmission reaches a predetermined maximum, the transmission ratio is reduced. However, this arrangement does not permit the engine to function according to a selected law of variation of torque during periods of acceleration. For example, when the driver rapidly depresses the accelerator pedal, the drive torque increases almost instantly although the engine cannot rapidly accelerate because of the inertia of the vehicle and the response time of the device for controlling the transmission ratio.

Another prior proposal involves the regulation of the speed of the engine and a transmission ratio of a hydrostatic transmission in which the driver sets the desired speed of the vehicle by regulation of the operating pressure in the hydrostatic transmission by a double acting hydraulic device operable to deliver a speed signal to the throttle of the engine and the ratio signal to the transmission pump. In this arrangement, the only possible operating characteristic of the engine, independent of the vehicle and load, is a linear characteristic of torque variation as a function of the speed which does not necessarily correspond to the desired characteristic.

SUMMARY OF THE INVENTION

The principal purpose and object of the present invention is to provide novel apparatus and method for the control of transmission ratio and control of the fuel supply to the internal combustion engine, which is effective, on selection of a particular power setting by the operator, to regulate the transmission ratio and engine fuel supply to permit the engine to deliver the desired power while operating according to a torque-speed characteristic which provides for optimum fuel consumption, minimum pollution or minimum noise.

Another object of the present invention is the provision of novel methods and apparatus for limiting the power delivered by the internal combustion engine during the starting period to avoid energy losses in the transmission and corresponding excessive fuel consumption.

In accordance with the present invention there is provided a control for the transmission ratio and fuel supply to an internal combustion engine which is applicable to an engine, the torque of which depends on the position of the setting of a device for regulating the fuel supply and a variable ratio transmission with a two channel input, one channel being effective to increase the transmission ratio and the other channel being effective to decrease the transmission ratio and a governor device for controlling the two channels depending on the position of the device governing the engine speed. The system of the present invention is further characterized by the fact that the governor automatically increases the transmission ratio when the engine speed is above the desired torque-speed characteristic and decreases the transmission ratio when the engine speed is below the desired torque-speed characteristic. According to a further feature of the invention the governor positions the fuel supply control device as a predetermined function of the measured engine speed.

In the following description, the transmission ratio is the ratio (N/V) where V is the vehicle speed and N is the engine speed. The transmission ratio which permits the vehicle to absorb all the power of the internal combustion engine on fixed torque-speed curve is given the arbitrary value of 1.

DESCRIPTION OF PREFERRED EMBODIMENT

Figure 1:
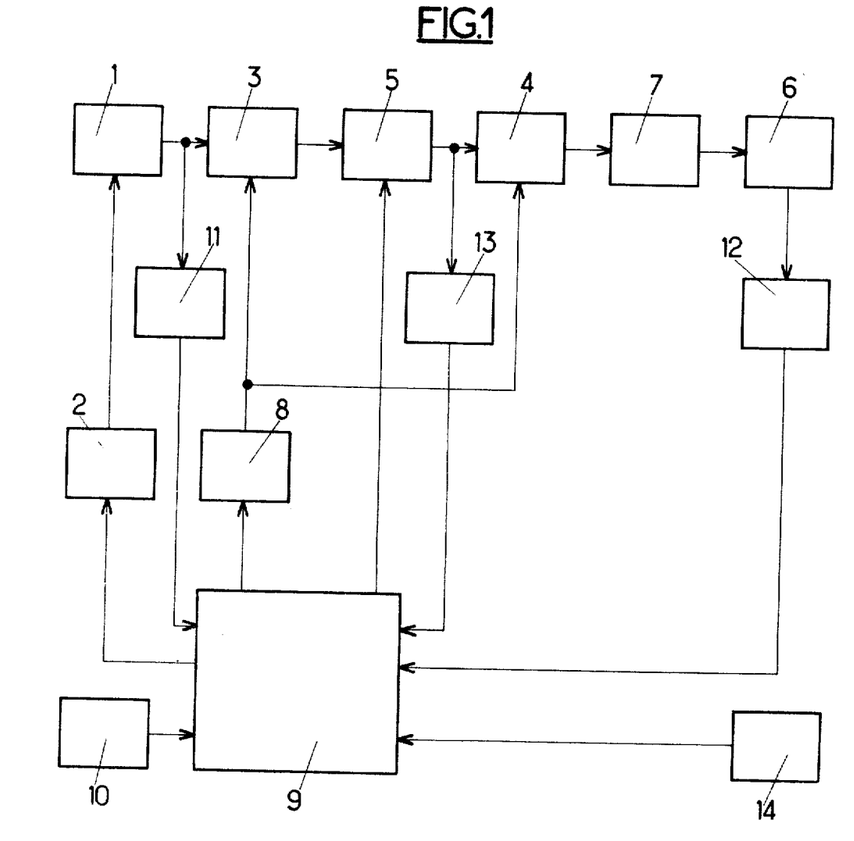
FIG. 1 is a block functional diagram illustrating schematically the principal components of the system of the present invention.
Figure 2:
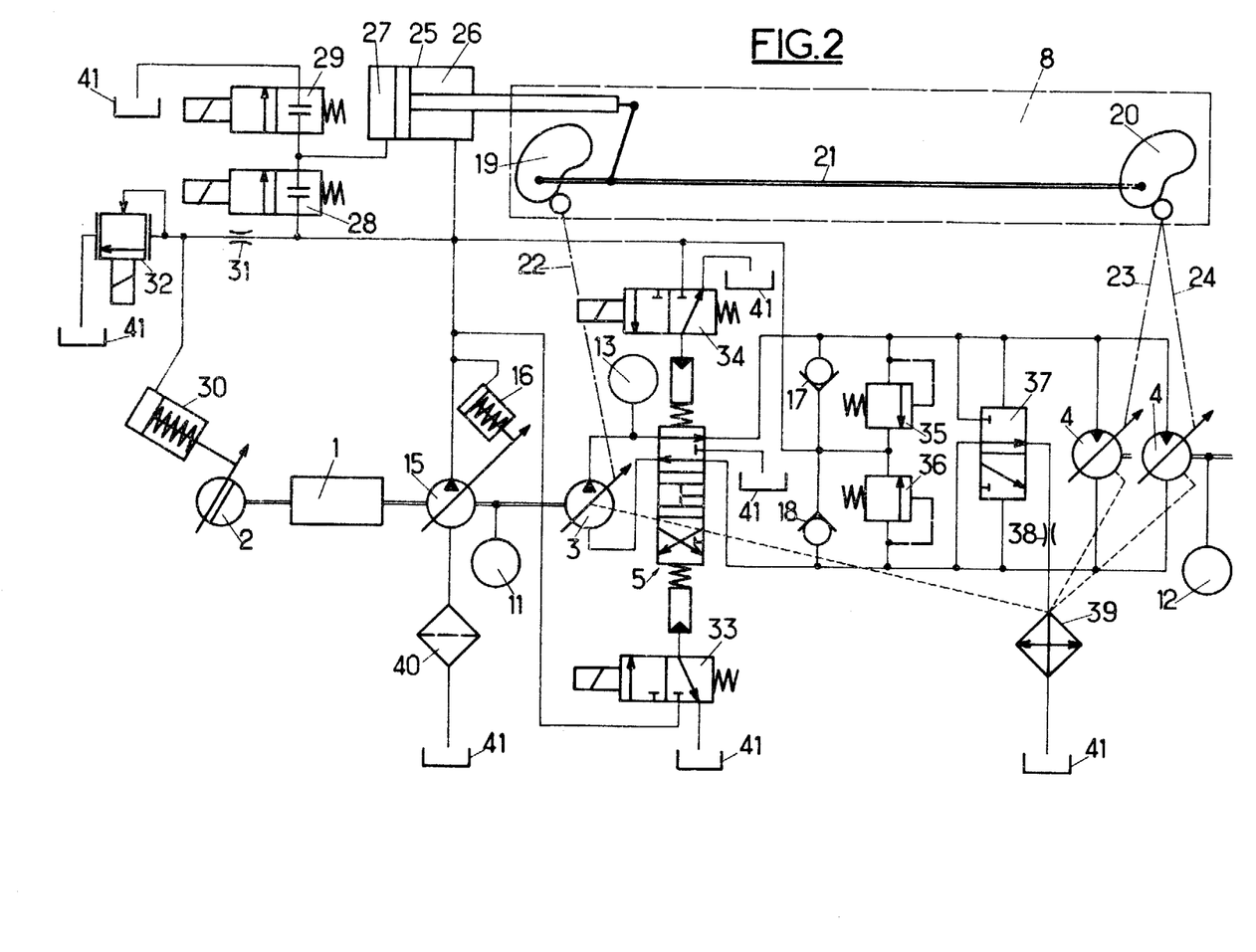
FIG. 2 illustrates schematically the principal mechanical elements of the control system of FIG. 1.

Referring now more particularly to FIGS. 1 and 2, 1 indicates a conventional internal combustion engine of the type in which the output torque depends on the position of a throttle 2 or similar device for regulating the fuel supply to the engine. The engine drives a variable ratio transmission comprising a variable capacity hydraulic pump 3 which supplies fluid under pressure to a pair of identical variable capacity hydraulic motors 4 through a bypass and reversing valve 5. The motors 4 drive vehicle wheels 6 through optional speed reducers 7.

The transmission ratio of the system is varied by varying the capacity of the pump 3 and the motors 4 by means of a control unit 8. The system also comprises as an essential element a governor unit 9 which receives a first input signal from the pickup 10 indicative of the position of the throttle 2, a second input signal from the pickup 11 indicative of the speed of the engine 1, a third input from the pickup 12 indicative of the rotary speed of the vehicle wheels, a fourth input from the pickup 13 indicative of the hydraulic pressure in the transmission system, and a fifth input indicative of the position of the drive selector 14.

The governor device 9 delivers three control signals, the first for controlling the position of the throttle 2, the second for regulating a mechanical control device 8 which sets the transmission ratio, and the third for controlling the operation of the bypass and reversing valve 5.

With continuing reference to FIG. 2, engine 1 also drives an auxiliary variable capacity pump 15 equipped with a conventional pressure regulator 16 which provides a source of control pressure within the system. The output of the pump is supplied to the transmission circuit through one way check valves 17 and 18, to the control chamber 26 for regulating the position of the control unit 8, to the unit 30 for regulating the position of the throttle 2, and to the bypass and reversing valve 5.

Figure 4:
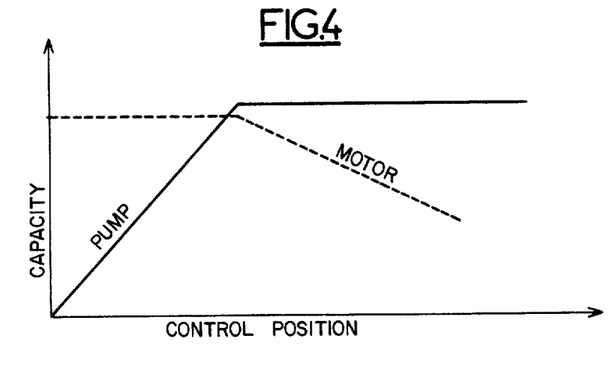
FIG. 4 illustrates graphically the variation in performance of the pump and motor of a hydraulic transmission depending upon the setting of the unit which controls the transmission ratio.

The control unit for setting the transmission ratio comprises two cams 19 and 20 connected by a mechanical link 21, the capacity of the pump 3 and the two engines 4 being controlled by cam followers connected to links 22, 23 and 24. Typically, as shown, the position of the cams 19 and 20 is controlled by the unit 25, the chamber 26 of the smaller section of which is constantly supplied with the pressure pg delivered by the pump 15. The opposite chamber 27 can be isolated or connected as desired with the pressure pg by a solenoid valve 28 or with the sump 41 by solenoid valve 29. In this way the cams 19 and 20 may be maintained in fixed position or rotated counterclockwise or clockwise as desired, depending on the actuation of the valves 28 and 29 which are controlled by signals from the governor device 9. As shown graphically in FIG. 4 in cams 19 and 20 are so arranged that as they are displaced from the zero setting, the capacity of the pumps 3 is gradually increased from zero to a fixed value and the capacity of motors 4, originally at a fixed maximum value, is gradually decreased.

The control chamber of the device 30 for regulating the position of the throttle 2 is supplied with a variable pressure through a calibrated orifice 31. A solenoid valve 32 with progressive opening as a function of the strength of the exitation current supplied to its solenoid cooperates with the orifice 31 to control the pressure supplied to the unit 30. The size of the orifice 31 as related to the stiffness of the return spring within the unit 30 makes it possible to position the throttle 2 as a continuous function of the exitation current of the valve 32, the current being delivered by a governor device 9.

Bypass and reversing valve 5 is a three position valve with hydraulic control and central position recall. In the central position valve 5 effectively disconnects the pump 3 and the motors 4. In the position shown in FIG. 2 valve 5 connects the output of pump 3 and the motors 4 in the manner to produce forward vehicle motion. In the opposite position the connection is reversed to produce reverse movement of the vehicle. The position of valve 5 is controlled by solenoid valves 33, 34 to which hydraulic fluid is delivered by the pump 15, the solenoids of these valves being controlled by the governor 9.

The hydraulic circuit also includes safety valves 35, 36 and a circulation valve 37, which, under certain circumstances permits bypassing a portion of the hydraulic fluid a feeding pressure to the sump 41 through the calibrated orifice 38. The circuit also includes a conventional cooler 39 and a filter 40.

Figure 3:
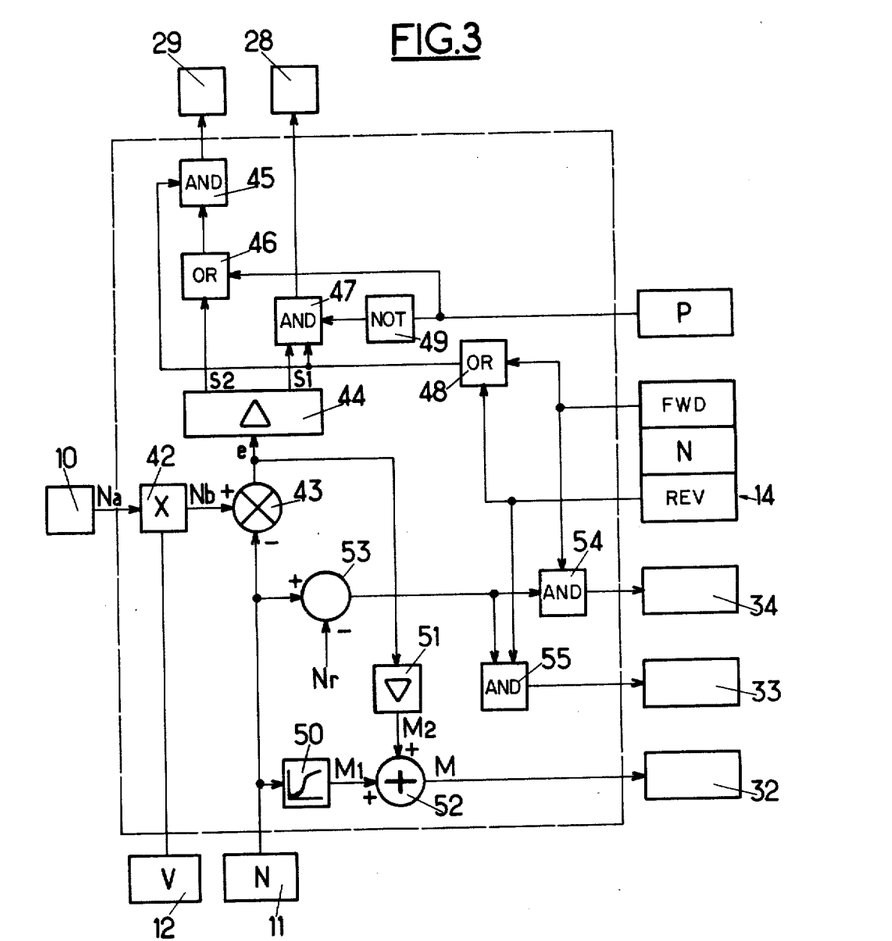
FIG. 3 is a functional block diagram illustrating the governor which forms a principal element of the control system of FIG. 1.

FIG. 3, to which detailed reference will now be made, discloses the governor 9 in greater detail. The pickup 10 which reflects the position of the manually manipulated engine control device, such as an accelerator pedal, supplies a signal N$a$ to the governor 9 which is changed to signal N$b$ by a sensitivity regulating device 42 which in turn is controlled by an input from the device 12 which reflects vehicle wheel speed.

Figure 5:
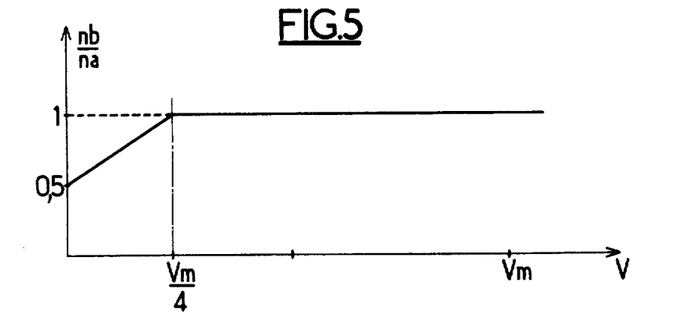
FIG. 5 and 6 are further curves illustrating two further aspects of the performance of the system of the present invention.

One purpose of the device 42 is to modify the signal N$a$ so that the operator, upon starting the vehicle, cannot operate the engine at full speed, even if he fully depresses the accelerator pedal. The speed of the engine can be attained, as shown in FIG. 5, only after the vehicle speed as reflected by the pickup 12 is approximately one quarter of the maximum speed of the vehicle. In a typical case, the device 42 is an analogue multiplier, and the output signals of the pickups 10 and 12 are direct current voltages, the pickup 10 generating a voltage which is a function of accelerator pedal displacement and the pickup 12 generating the voltage a function of wheel speed.

Comparator 43 compares the signal N$b$ with the signal N reflecting the actual speed of the engine as determined by pickup 11. Error $e = Nb - N$ is amplified in amplifier 44 having two outputs, S1 and S2 delivered to the solenoids 28 and 29 of the control valves of the transmission ratio selector through "AND" gates 45 and 47 and an "OR" gate 46. Output S1, which operates the solenoid 28 to reduce the transmission ratio is excited when $e<0$. Output S2 which energizes solenoid 29 to increase the transmission ratio is excited when $e>0$. Because of the preset threshhold of amplifier 44 the solenoids 28 and 29 remain deenergized so long as $e$ has a value equivalent to a predetermined low number of revolutions per minute.

The AND gates 45 and 47 prevent the energization of solenoids 28 and 29 except when the motion selector 14 has been placed in the forward or in the reverse position, this information being transmitted through the OR gate 48. Further, the "NOT" gate 49 prevents the energization of the solenoid 28 to reduce the transmission ratio when pressure pickup 13 indicates that the pressure in the transmission circuit has reached a preset maximum value Pc slightly less than the calibrated pressure of the pressure relief valves 35 and 36. The OR gate 46 on the other hand, permits energization of the solenoid 29 to increase the transmission ratio when the pressure in the transmission reaches the value Pc and the selector lever indicates that forward or reverse motion of the vehicle has been selected.

Figure 6:
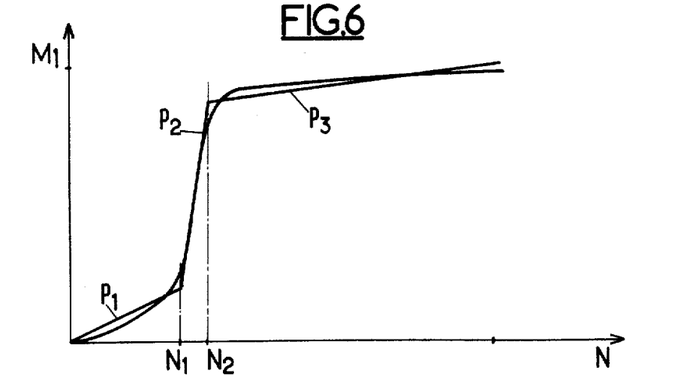

The governor 9 also includes a function generator 50 which delivers a signal M1 for opening throttle 2 as a function of the actual speed of the engine 1 and a function of the desired operating characteristics of the engine, a typical relation between the throttle opening signal M1 and the engine speed being shown in FIG. 6.

Figure 7:
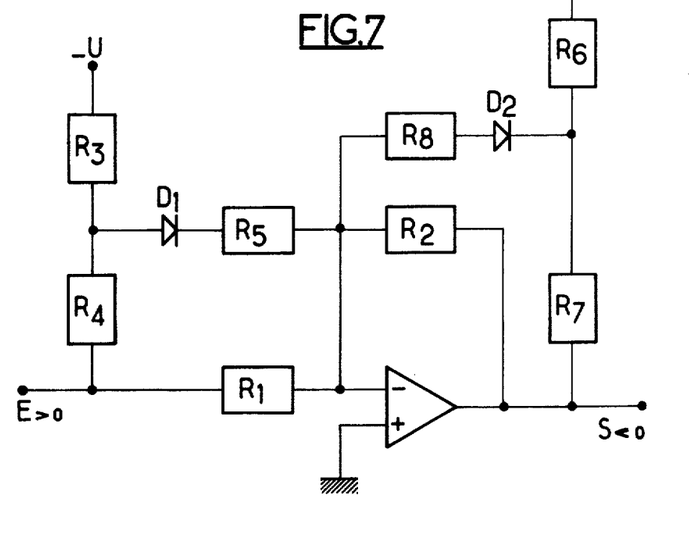
FIG. 7 is a schematic illustration of a unit for generating control signals to regulate the position of the engine throttle.

The generator 50 which is essentially an amplifier, shown in greater detail in FIG. 7, approaches an ideal curve by breaking the curve down into a number of straight line segments, the number of which depends on the precision desired. In the embodiment shown, generator 50 provides three straight line segments, $p1$, $p2$ and $p3$ which approximate the ideal figure. The slope $p1$ is determined by the resistors R1 and R2. Diode D1 and resistors R3 and R4 determine the speed $n1$ at which slope $p2$ begins, the slope $p2$ being determined by resistor R5. Diode D2 and resistors R6, R7 determine the speed $n2$ at which slope $p3$ begins, the slope of the curve $p3$ being determined by resistor R8.

Figure 8:
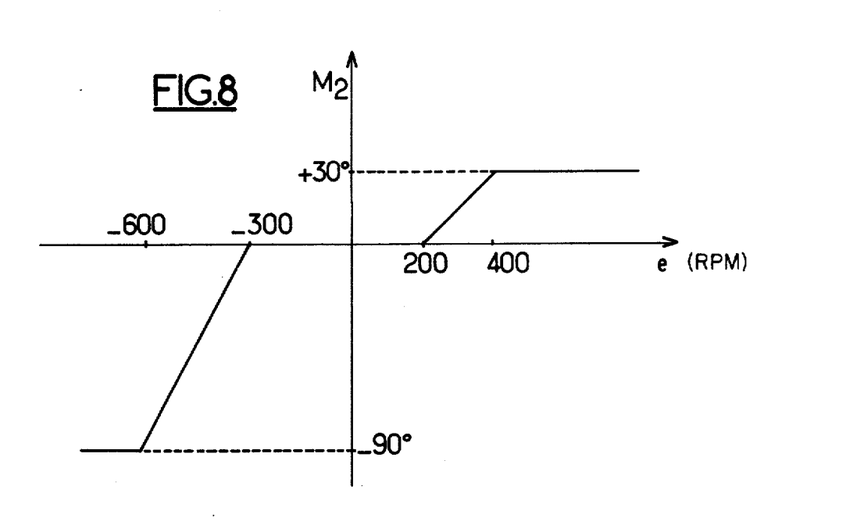
FIG. 8 graphically illustrates the performance of the control signal generator of FIG. 7.

Amplifier 51 modifies signal M1 with the value M2 when the error $e$ exceeds a predetermined value in the order of several hundred rpm. An example of the functioning of amplifier 51 is shown diagramatically in FIG. 8. The final throttle opening signal M determined by adder 52 is delivered to the solenoid for the throttle control valve 32.

The governor also includes a comparator 53 which delivers a signal when the speed of the engine is greater than a reference speed Nr, which is less than idle speed. The signal is delivered to AND gates 54 and 55 which respectively receive the forward and reverse signals of selector 14 and which energize the solenoids of valves 34 or 33 to obtain the desired direction of the vehicle depending on the position of the drive selector 14 as long as the engine has a speed greater than Nr. Conversely, if the speed falls to a value equal to or less than Nr the signal to the solenoids of valves 34 and 33 is interrupted regardless of the position of the drive selector 14 and valve 5 is spring returned to the neutral position effectively disconnecting the transmission circuit to prevent the engine from stalling.

In the system thus far described the governor 9 delivers a signal to the solenoid 28 or 29 to increase or decrease the transmission ratio fully. However it is possible to use a progressive control by utilizing a governor delivering increase or decrease signals at a constant frequency but with a variable width by selecting a signal frequency which is high in comparison with the frequency of the transmission. The output pulses of the solenoid valves 28 and 29 will gradually pulse the transmission toward a higher or lower ratio.

Further advantages of the system will become apparent from a description of the overall function of the system in different situations. First, it may be assumed that the vehicle is travelling forward at a constant speed greater than one fourth of its maximum speed and that the operator depresses the accelerator pedal signalling an engine speed Na2 greater than Na2 previously established. Since the speed of the vehicle [$>(Vm/4$] the signal Na2 is not modified by the unit 42 and $Nb = Na2$. Since the engine is operating at a speed corresponding to previous signal Na1 the output S2 of smplifier 44 will be energized to energize solenoid of valve 29 and increase the transmission ratio. The increase in transmission ratio is accomplished by reduction of the capacity of the pump 3 or by an increase of the capacity of the motors 4 depending upon the initial position of the control unit 8. In either case the load on the engine diminishes and the speed of the engine increases.

As the speed increases the function generator 50 signals a greater opening of the throttle which increases the engine rpm. When the speed of the engine reaches the value of the signal Nb the signal from the amplifier 44 is extinguished and the transmission ratio no longer increases.

The vehicle accelerates until the speed of the engine becomes greater than the signalled speed Nb resulting in excitation of the output S1 of the amplifier and operation of the solenoid valve 28 to decrease the transmission ratio. The decrease in transmission ratio continues until the load on the engine is increased sufficiently until the engine speed becomes equal to the signalled speed Nb, thus assuring that the engine functions on the predetermined torque-speed curve.

The system operates in the following manner when the engine is started. When the signalled speed Nb exeeeds the actual engine speed by a certain preestablished value $e1$ (several hundred rpm) the amplifier 51 establishes a signal M2 for opening the throttle (about 30°) and permits the engine to reach the signalled speed Nb with a starting torque close to the maximum torque of idling. As the speed of the engine increases, amplifier 50 adds a signal M1 for opening throttle according to the characteristic of FIG. 6. When the actual speed of the engine is close to the signalled speed, the signal M2 is decreased progressively, but the engine continues to accelerate because of the signal M1 and eventually its speed becomes greater than the signalled speed Nb. When this occurs amplifier 44 signals an increase in the capacity of the pump 3, the vehicle starts and amplifier 51 delivers a negative or throttle closing signal M2 opposing signal M1, the strength of the signal M2 being a function of the excess of the actual speed N over the signalled speed Nb. Since the torque absorbed by the pump 3 is greater than zero the residual opening of the throttle corresponds to the starting torque of the vehicle.

When the capacity of pump 3 increases, the hydraulic pressure in the transmission system tends to rise to its maximum value since the inertia of the vehicle prevents motors 4 from instantly absorbing the delivery of the pump. During the engine starting period the delivery pressure of the pump 3 rises to the calibrated value of the safety valve 35, particularly if the output of the pump 3 is rapidly increased. However pressure pickup 13 transmits a signal before the pressure reaches the calibrated value of valves 35. The governor 9 then signals a reduction of the cylinder capacity of the pump 3 through OR gate 46, AND gate 45 and extinguishes the signal for increase of the pump capacity through NOT gate 49 and AND gate 47. When the system pressure drops below the preregulated value Pc to which pickup 13 is sensitive, the signal for increase of the cylinder capacity of pump 3 is given by amplifier 44 and is reestablished.

With this mode of operating the operator does not feel the transient change of the capacity of the pump 3 or the motors 4 since the response time of the solenoid valves 28, 29 is very rapid in comparison with the rate of pressure change in the transmission system. In practice the operator senses only acceleration of the vehicle which is linked directly to the pressure of the hydraulic circuit. The capacity of pump 3 is therefore automatically determined to permit the vehicle to accelerate with maximum torque without significant loss of energy through the valve 35.

As the capacity of the pump 3 increases the load and torque of the engine increases and its speed is reduced to approximate the value of the signalled speed N$b$. Negative order M2 to close the throttle decreases and the throttle gradually opens to a value corresponding to the signalled speed along the curve prescribed by generator 50. Accordingly, the governor 9 permits the engine to reach the signalled speed at the end of a very short time and then increases the engine torque as the vehicle speed rises so that the vehicle has a maximum constant acceleration without loss of power in the transmission.

It will be noted that a starting the unit 42 permits only a setting of reduced power of the engine. It can also be seen that control system avoids loss of energy when the vehicle requires increased torque either to accelerate or to maintain speed on an incline. Under these conditions the pressure in the transmission circuit increases and reaches a calibrated value Pc of valve 35.

As stated above, when the pressure Pc is reached pickup 13 signals a reduction of the capacity of the pump 3 permitting an acceleration of the engine beyond the signalled speed N$b$ and consequently establishing a throttle closing signal M2 through the amplifier 51. Alternately the pickup 13 may deliver a voltage proportional to the system pressure and establish a throttle closing signal M2 directly proportional to pressure. The signal M2 under these circumstances can be approximately a linar function of the difference between the pressure of the pump 3 and the preregulated value Pc of the pressure.

For towing, the valve 5 is placed in bypass position by moving drive selector 14 to the neutral position.

Figure 9:
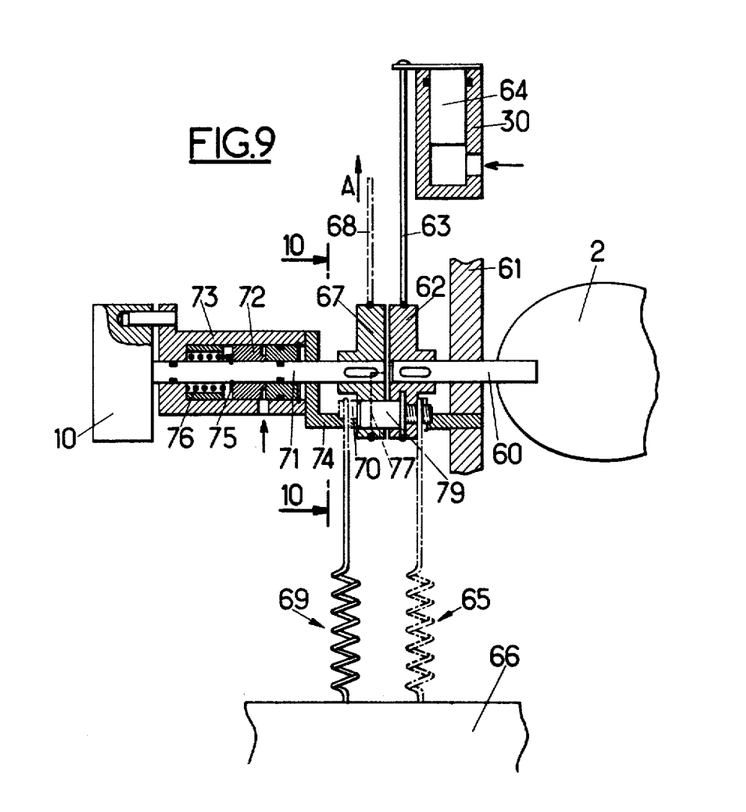
FIG. 9 is a view, partly in section, of a typical throttle control device.
Figure 10:
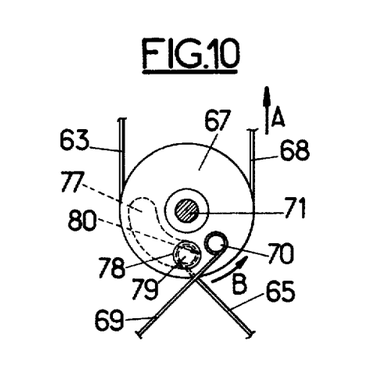
FIG. 10 is a fragmentary transverse section taken along line 10—10 of FIG. 9.

FIGS. 9 and 10, to which detailed reference will now be made, illustrate a system for mechanically connecting the accelerator pedal to the throttle in a manner to facilitate initial starting of the engine and to permit the function of the overall system in a manner above described.

As shown in FIG. 9 the throttle 2 is carried by shaft 60 rotatable in the body 61 of the carburetor. Shaft 60 carries a first pulley 62 adapted to be rotated by a cable 63 connected to piston 64 of the control device 30. The pulley, cable and control unit are normally urged to a throttle closed position by spring 65 connected to fixed vehicle structure 66. These elements are operative during normal running of the vehicle.

The second pulley, 67, connected to the accelerator pedal (not shown) by a cable 68, is also normally urged toward a throttle closed position by spring 69 connected at one end to the fixed vehicle structure 66 and its opposite end to a pin 70 carried by a pulley 67. The pulley 67 is rotatable with a shaft 71 extending to the pickup 10 to control the operation of the latter. Shaft 71 carries a piston 72 slidably mounted within control unit 73, the piston, shaft and pulley 67 being urged to the right under the influence of spring 76 to the position shown in FIG. 9 and being urged to the left by the application of system pressure P$g$ acting on the right face of piston 72. Pulley 67 is provided with an oblong arcuate recess facing the pulley 62 and terminating at one end in the through opening 78 adapted to receive a pin 79 carried by the pulley 62.

When the engine is off, the components occupy the position shown in FIGS. 9 and 10 with the throttle 2 closed and pin 79 extending through opening 78, thus locking the pulleys 67 and 62 together. When the accelerator pedal is depressed for starting, the cable 68 is moved upwardly (direction A) as viewed in FIGS. 9 and 10 and the pulleys 67 and 62 are rotated in a counterclockwise direction B to open the throttle 2. As soon as the engine operates and pressure P$g$ is established, piston 72, shaft 71 and pulley 67 are urged to the left sufficiently to permit the end of pin to leave the hole 78 but remain in the recess 77. Recess 77 is long enough so that a total depression of the accelerator pedal can be effected without rotation of the pulley 62 after pin 79 leaves opening 78.

The throttle is then opened by the piston 64 acting under the influence of the governor 9, and pickup 10 transmits the speed signal set by the operator by manipulation of the accelerator pedal.

This arrangement also provides for a safety override. For example, if the governor 9 signals an improper opening of the throttle the operator can always close the throttle by simply releasing accelerator pedal. In this event, pulley 67 rotates in a clockwise direction until the end of the recess 77 comes in contact with pin 79. Thereafter the pulleys 67 and 62 move together in a throttle closing direction. Spring 69 is set so that its tension is always greater than that of spring 65 to assure full closing of the throttle under these circumstances.

The above described control system is easily adaptable to an engine controlled by mechanical or electronic fuel injection. In the case of electronic fuel injection there is, for each power setting of the engine, a corresponding opening of the air regulating valve equivalent to the throttle of the carburetor. In the case of mechanical injection the problem is essentially the same and the air regulating throttle would therefore be regulated as the throttle of the carburetor.

In the case of an engine with electronic fuel injection whose drive torque depends on an electric signal regulating for example, injection period, the control system of the present invention can be applied by adapting the electrical signal of governor 9 to that necessary for the electronic injection device. By analogy, the electronic injection device unit will be called the fuel feed regulating device and the position of the regulating device will be the electric voltage characterizing the functioning point of the fuel injection.

Also, valve 5 may be replaced by a manual control valve with a recall to a central position by a spring and held in position by a latch. In this event the control would be performed directly by the drive selector 14. Restoration of the valve central position when the engine has a tendency to stall would be performed by an electro magnet for unlocking the valve and actuated by the comparator 53. An electric contact which closes as soon as valve 5 leaves the central position provides the necessary information to the gate 48.

It is also possible to use separate controls for regulating the capacity of the pump on the one hand and the motors on the other.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for controlling the transmission ratio and the fuel supply of a propulsive unit of a vehicle including an engine whose torque depends on the fuel supply, a fuel supply control unit, a variable ratio transmission driven by said engine, said transmission having two control inputs controlling, respectively, an increase and decrease of said ratio, operator controlled means for selecting a desired speed ($Nb$) of said engine, means for measuring the actual speed ($N$) of said engine, a dual output governor, the first output of said governor being connected to said control inputs of said transmission and the second output controlling said fuel supply unit, the first output of said governor sending first signal to said input controlling an increase of ratio each time that said selected speed ($Nb$) is higher than said actual speed ($N$) and sending a second signal to said input controlling a decrease of said ratio each time that said selected speed ($Nb$) is lower than said actual speed ($N$), a function generator which sends by the second output of said governor a third signal for controlling the position of said fuel supply control unit, the magnitude of said third signal depending on the desired torque corresponding to each engine speed as preset in said function generator and said actual engine speed ($N$), and an amplifier responsive to the difference ($Nb-N$) between said actual speed and said selected speed, the output of said amplifier being effective to modify said third signal when said difference is higher than a predetermined value.

2. Apparatus according to claim 1, in which said amplifier controls said fuel supply control unit to discontinue the supply of fuel when said actual speed ($N$) is substantially higher than said selected speed ($Nb$), and controls a limited opening of said unit when said actual speed ($N$) is substantially lower than said selected speed ($Nb$).

3. Apparatus according to claim 2, in which said variable ratio transmission is a hydrostatic transmission, together with a sensor responsive to the hydraulic pressure applied by said transmission, said sensor producing an output signal when said pressure exceeds a predetermined value, the output signal delivered by said sensor being effective to increase the ratio of said transmission.

4. Apparatus according to claim 1, together with means for mechanically disconnecting said fuel supply control unit and said operator controlled means.

5. Apparatus according to claim 4, in which said mechanical disconnection is hydraulically actuated by the output pressure of a control pump driven by said engine.

6. Apparatus according to claim 1, further comprising means for acting on said fuel supply unit to discontinue the fuel supply when said operator controlled means is in rest position, notwithstanding the value of engine actual speed and the position of said fuel supply control unit.

7. Apparatus according to claim 1, further comprising a sensing device responsive to vehicle speed ($V$) and a member for sensitivity adjustment controlled by said sensing device and which modifies said selected speed ($Nb$) as a function of vehicle speed ($V$).

* * * * *

UNITED STATES PATENT AND TRADEMARK OFFICE
CERTIFICATE OF CORRECTION

PATENT NO. : 3,890,360
DATED : June 17, 1975
INVENTOR(S) : Francis Pruvot et al

It is certified that error appears in the above-identified patent and that said Letters Patent are hereby corrected as shown below:

Column 3, line 64, change "in" (second occurrence) to --the--.

Column 4, line 30, change "a" to --at--.

Column 6, line 7, change "No. 2" (second occurrence) to --No. 1--.

Column 7, line 31, change "a" to --at--.

Column 7, line 47, change "linar" to --linear--.

Signed and Sealed this sixteenth Day of September 1975

[SEAL]

Attest:

RUTH C. MASON
*Attesting Officer*

C. MARSHALL DANN
*Commissioner of Patents and Trademarks*